Figure 1:
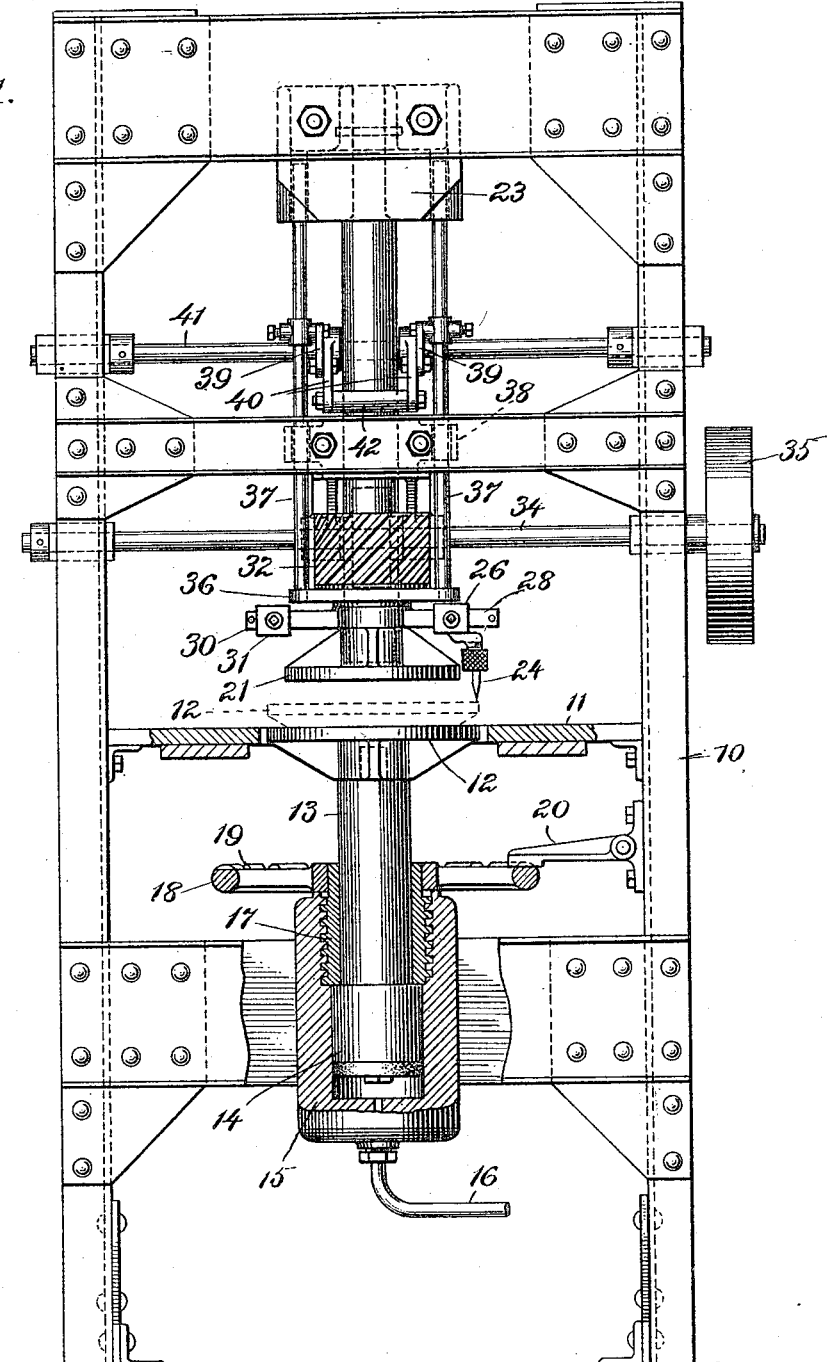

J. R. GAMMETER.
METHOD AND APPARATUS FOR PRODUCING RUBBER MOLDING BLANKS.
APPLICATION FILED SEPT. 8, 1914.

1,214,295.

Patented Jan. 30, 1917.
2 SHEETS—SHEET 1.

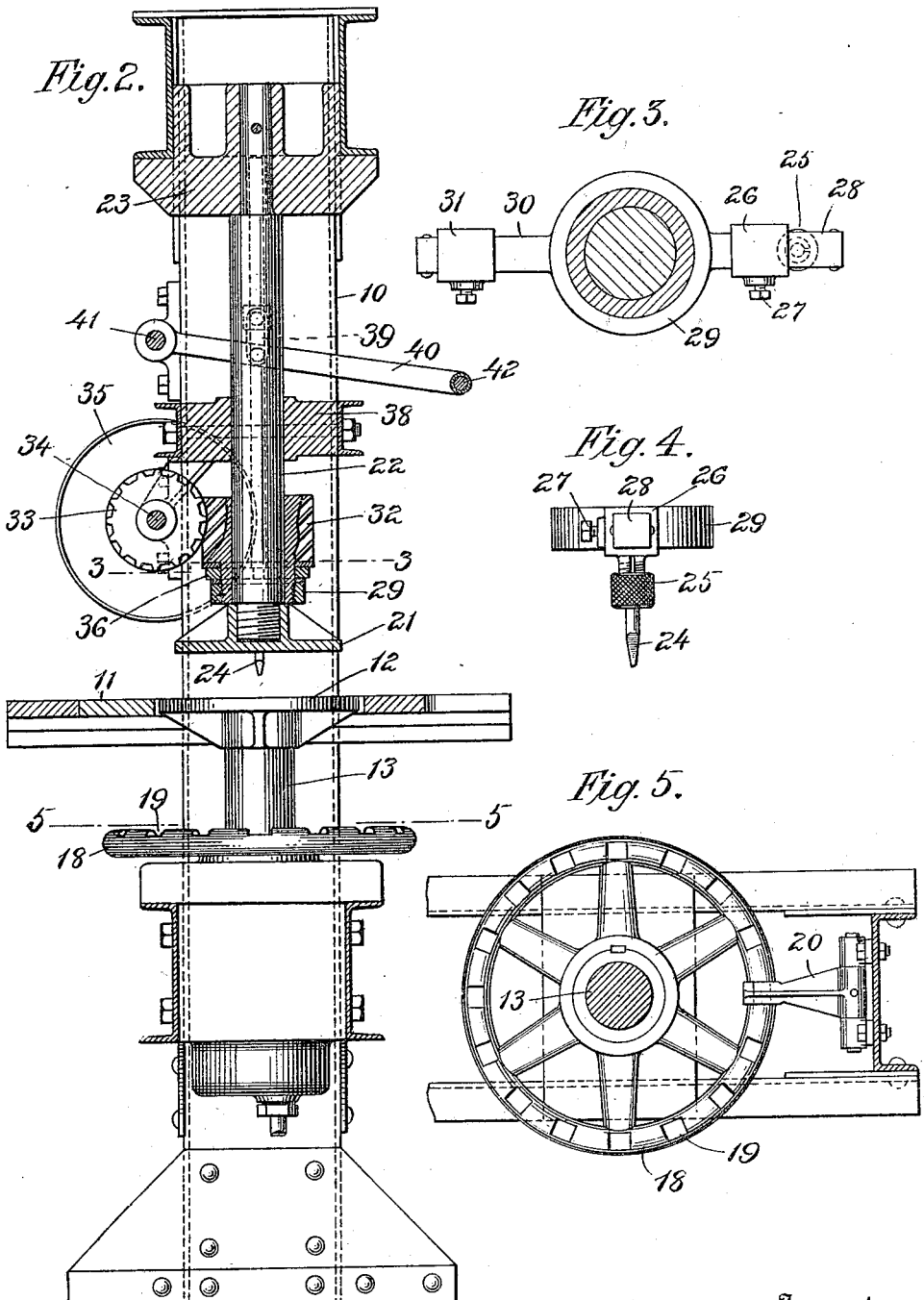

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

METHOD AND APPARATUS FOR PRODUCING RUBBER MOLDING-BLANKS.

1,214,295. Specification of Letters Patent. Patented Jan. 30, 1917.

Application filed September 8, 1914. Serial No. 860,645.

*To all whom it may concern:*

Be it known that I, JOHN R. GAMMETER, a citizen of the United States, residing at Akron, in the county of Summit and State of Ohio, have invented certain new and useful Improvements in Methods and Apparatus for Producing Rubber Molding-Blanks, of which the following is a specification.

This invention relates to a machine and process for cutting molding-blanks out of rubber so that each blank shall contain a predetermined amount of rubber, thus avoiding the disadvantages of the method in common use which consists in weighing the rubber and cutting it by hand in order to provide the proper quantity of rubber to fill the mold without incurring substantial waste.

My object is to avoid the use of dies and to provide a machine which may readily be adjusted to cut different-sized blanks, more particularly those having a circular outline.

Of the accompanying drawings, Figure 1 represents a front elevation of a rubber-blank cutting machine constructed according to my invention. Fig. 2 represents a transverse vertical section. Fig. 3 represents an enlarged horizontal section on the line 3—3 of Fig. 2, showing the adjustable knife-holder and its support. Fig. 4 represents an end view of the last-mentioned parts. Fig. 5 represents a horizontal section on the line 5—5 of Fig. 2.

In the drawings, 10 is the frame of the machine, 11 is a platform for the support or storage of the slab or the uncut blanks, and 12 a vertically-movable lower abutment or platen mounted in an aperture in said platform and attached to the upper end of a plunger 13 whose lower end carries a piston 14 working in a hydraulic cylinder 15. 16 is the supply and discharge pipe for said cylinder, connected with a suitable source of pressure and with valve mechanism (not shown) for controlling the movements of the piston 14. An adjustable stop is provided for determining the upper limit of movement of the piston and platen, said stop being constituted by the lower end of a nut 17 which screws in the top of the cylinder and is provided with a hand-wheel 18 having notches 19 on its upper surface co-acting with a gravity pawl 20, whereby the hand-wheel is held stationary in its different adjustments. Fig. 1 shows the nut 17 in its lowermost position corresponding to the maximum thickness of blank.

21 is a circular platen forming an upper abutment for the rubber blank and mounted in a fixed position on the lower end of a vertical rod or stem 22 whose upper end is attached to a fixed cross-head 23 on the frame of the machine.

24 is a revolving knife adjustably held in a chuck 25 which depends from a square collar 26 secured by a set-screw 27 to a knife-supporting arm 28, so that the knife may be fixed in different radial positions along said arm. The arm is formed on a collar 29 having an oppositely-projecting arm 30 and an adjustable counter-weight 31. The collar 29 screws on the downwardly-projecting hub of a spiral gear 32 whose teeth mesh with those of a second spiral gear 33 mounted on a horizontal shaft 34 and driven by a belt-pulley 35.

The gear 32 rotates upon the fixed rod 22 and is also movable vertically thereon, the vertical movement being imparted by a thrust-plate 36, carried by a pair of rods 37 which are guided in the upper cross-head 23 and in a lower fixed cross-head 38, these rods 37 being connected by links 39 with a lever 40 pivoted on a rock-shaft 41 and having a handle 42 at its front end. The face of the gear 32 is long enough to permit an amount of vertical movement of said gear and the revolving knife-holder, from the lowermost position of said parts shown in Figs. 1 and 2, corresponding to the maximum depth of cut.

In setting the machine to cut a blank containing a given weight and volume of rubber the knife-holder 26 is adjusted to a radial position which will cause the knife to cut a blank slightly larger than the desired diameter to allow for the radial contraction of the blank when the vertical pressure maintained during the cutting operation is relieved. The weight of a blank which will give it the necessary volume to fit a certain mold being known, it is then a comparatively simple matter to give the finished blank this weight and volume by raising or lowering, by means of hand-wheel 18, the nut 17 which determines the upper limit of movement of the platen 12. It will be understood that the knife 24 is given a corresponding vertical adjustment in its chuck so that the point of said knife just fails to reach the platen when the latter is in its operative position, as represented by the dotted lines in Fig. 1. This position having been determined, the raising and lowering of the platen to compress the rubber slab from which the blank is cut, and to relieve the pressure upon the finished blank and permit its removal, is accomplished hydraulically. The slab is inserted while the revolving knife is held in a raised position by means of the hand-lever 40, and the pressure is admitted to cylinder 15 so as to carry the piston 14 up against the stop-nut 17. The knife is then gradually lowered and caused to cut through the rubber slab as it revolves until it reaches its lowermost position as shown in Figs. 1 and 2, after which the knife is raised, the platen lowered and the finished blank removed.

The invention is not to be confined to the exact details of construction shown, and is not wholly limited to a knife mounted to travel in a circular path, although this is the simplest arrangement.

I claim:

1. The method of making rubber molding-blanks containing a definite volume of material which consists in compressing to a predetermined reduced thickness a slab of rubber having in its natural form a greater thickness, and so holding it while a knife is caused to move in a circumscribing path defining the desired outline of the blank in order to cut said blank out of the slab, and then releasing the pressure and allowing the blank to assume its natural form.

2. In a machine for cutting rubber molding-blanks containing a predetermined volume of material, the combination of means for compressing a slab of the material, an adjustable stop for limiting the compression to a definite thickness, a knife mounted in operative relation to the slab-compressing means, and means for moving said knife in a definite circumscribing path to cut out a blank of the desired outline.

3. In a machine for cutting rubber blanks, the combination of a fixed upper abutment for the blank, a vertically-movable lower abutment or platen, means for elevating and depressing said lower abutment, an adjustable stop for limiting the upward movement of said platen, and a revolving knife-holder.

4. In a machine for cutting rubber blanks, the combination of a vertically-movable plunger having a platen at its upper end and a piston at its lower end mounted in a cylinder, a stop-nut for said piston surrounding the plunger and screwing in the upper end of said cylinder, a hand-wheel for said nut, an upper blank abutment, and a revolving knife-holder.

5. In a machine for cutting rubber blanks, the combination of upper and lower abutments for the blank of which the lower one is vertically movable, a knife-holder mounted to revolve about the upper abutment, a rotary support for said knife-holder attached to a gear having a vertically-elongated face, a stationarily-mounted mating gear, and a vertically-movable thrust-member for raising and lowering the first-said gear and the knife-holder.

6. In a machine for cutting rubber blanks, the combination of a vertically-movable abutment or platen, an adjustable upper stop therefor, an upper abutment attached to the lower end of a fixed vertical rod, a gear with a vertically-elongated face, mounted to turn upon said rod and movable vertically thereon, a knife-support attached to said gear, a thrust-plate in which the hub of said gear revolves, and a hand-lever and connections for raising and lowering said thrust-plate.

In testimony whereof I have hereunto set my hand in the presence of two subscribing witnesses, this 3 day of September, 1914.

JOHN R. GAMMETER.

Witnesses:
 WALTER K. MEANS,
 ILLA N. KIRN.

Copies of this patent may be obtained for five cents each, by addressing the "Commissioner of Patents, Washington, D. C."